(12) United States Patent
Han

(10) Patent No.: US 9,544,920 B2
(45) Date of Patent: Jan. 10, 2017

(54) RANDOM ACCESS PROCEDURE FOR DUAL CONNECTIVITY

(71) Applicant: Seunghee Han, Cupertino, CA (US)

(72) Inventor: Seunghee Han, Cupertino, CA (US)

(73) Assignee: Intel IP Corporation, Santa Clara, CA (US)

(*) Notice: Subject to any disclaimer, the term of this patent is extended or adjusted under 35 U.S.C. 154(b) by 69 days.

(21) Appl. No.: 14/495,292

(22) Filed: Sep. 24, 2014

(65) Prior Publication Data

US 2015/0215967 A1 Jul. 30, 2015

Related U.S. Application Data

(60) Provisional application No. 61/933,839, filed on Jan. 30, 2014.

(51) Int. Cl.
*H04W 4/00* (2009.01)
*H04W 74/08* (2009.01)
*H04W 74/00* (2009.01)

(52) U.S. Cl.
CPC ....... *H04W 74/0833* (2013.01); *H04W 74/002* (2013.01)

(58) Field of Classification Search
CPC combination set(s) only.
See application file for complete search history.

(56) References Cited

U.S. PATENT DOCUMENTS

| 2013/0201960 | A1* | 8/2013 | Kim | .................. H04W 72/0446 370/331 |
| 2015/0029955 | A1* | 1/2015 | Heo | ...................... H04W 76/02 370/329 |
| 2016/0066228 | A1* | 3/2016 | Fan | ....................... H04W 36/08 370/331 |

FOREIGN PATENT DOCUMENTS

WO  WO 2015/020576  *  2/2015

* cited by examiner

*Primary Examiner* — Frank Duong
(74) *Attorney, Agent, or Firm* — Schwegman Lundberg & Woessner, P.A.

(57) ABSTRACT

In dual connectivity, a UE is served by cells are operated in different eNBs with one eNB designated as the master eNB (MeNB) and the other as a secondary eNB (SeNB). A random access procedure is described by which a UE connected to an MeNB may attempt to acquire access to an SeNB cell. The procedure may utilize the backhaul connection between the SeNB and the MeNB so that the random access response may be transmitted over an MeNB cell.

24 Claims, 3 Drawing Sheets

RANDOM ACCESS PROCEDURE FOR DUAL CONNECTIVITY

PRIORITY CLAIM

This application claims the benefit of priority under 35 U.S.C. 119(e) to U.S. Provisional Patent Application Ser. No. 61/933,839, filed Jan. 30, 2014, which is incorporated herein by reference in its entirety.

BACKGROUND

Dual connectivity refers to the ability of a mobile terminal to communicate simultaneously with two base stations using different carrier frequencies. The advantages of dual connectivity include a reduction in the number of failures in performing handovers of a terminal from one base station to another, a reduction in the amount of signaling required from the network in performing handovers, and enhanced user throughput.

In LTE (Long Term Evolution) cellular systems, as set forth in the specifications of the 3rd Generation Partnership Project (3GPP), a mobile terminal is referred to as user equipment (UE) and a base station is referred to as an evolved Node B (eNB). The UE initially acquires uplink (UL) and downlink (DL) resources from the eNB for transmitting and receiving data by performing a random access (RA) procedure using the physical random access channel (PRACH). The PRACH is a specific set of time-frequency resources allocated by eNB for use by UEs in performing the RA procedure. If periodic scheduling request (SR) resources are not allocated to the UE by the network, the random access process is also used by the UE to acquire uplink resources for all subsequent data transmission. The RA procedure is also used if the UE loses time synchronization with the eNB. The primary concern of the present disclosure is the manner in which random access procedures is performed by a mobile terminal in a dual connectivity context.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In dual connectivity, the UE is served by cells are operated in different eNBs with one eNB designated as the master eNB (MeNB) and the other as a secondary eNB (SeNB). The MeNB is the base station responsible for acting as a mobility anchor for the UE. Typically, the MeNB operates a macrocell, and the SeNB operates a smaller cell (e.g., a picocell) using different carrier frequencies. The MeNB and the SeNB may each provide one or more serving cells to a UE where a single serving cell refers to a DL carrier and a paired UL carrier in the case of FDD (frequency division duplexing) and refers to a single carrier in the case of TDD (time division duplexing). An MeNB or SeNB cell may be either a primary cell, through which the UE establishes or re-establishes an RRC connection, or may be a secondary cell that provides additional radio resources.

Figure 1:
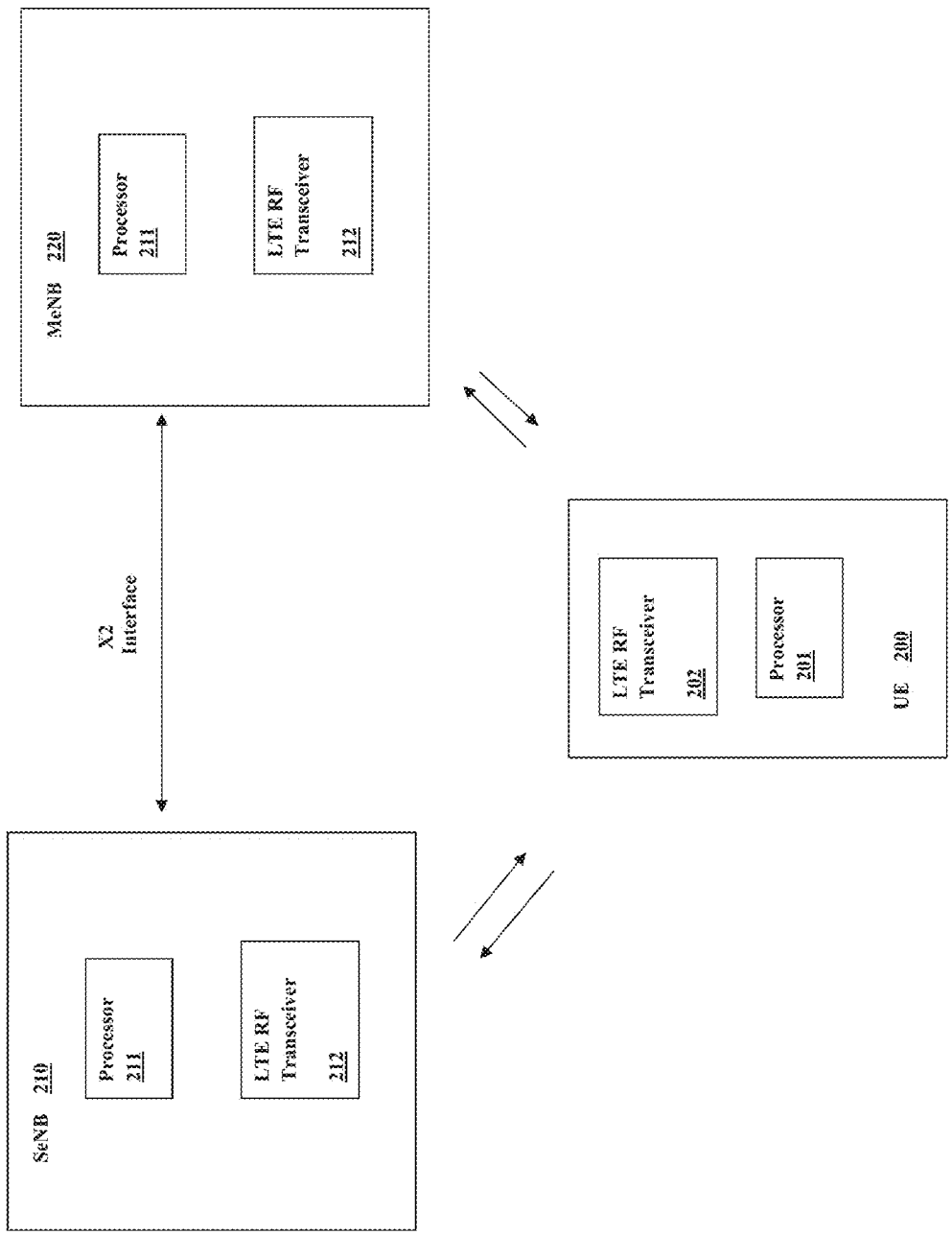
FIG. 1 shows an example configuration where a UE is connected to two different eNBs in accordance with some embodiments.

FIG. 1 shows an example of a UE 200 with dual connectivity to an SeNB 210 and an MeNB 220. The UE 200 and eNBs 210/220 incorporate processing circuitries 201 and 211, respectively, each of which is intended to represent any type of hardware/software configuration for performing the processing functions as described below. The processing circuitry 201 in the UE 100 is interfaced to an RF (radio-frequency) transceiver 202, and the processing circuitries 211 in the eNBs 210/220 are each interfaced to an RF transceiver 212, where an RF transceiver is understood to incorporate one more antennas for transmitting and receiving RF signals. The RF transceivers 202 and 212 may each comprise multiple RF transceivers. In particular, the transceiver 202 of UE 200 may comprise two RF transceivers or be a single transceiver with two Tx-Rx (transmit-receive) chains for enabling dual connectivity. The MeNB and SeNB communicate with one another via a backhaul connection such as what is referred to as an X2 interface.

At a high level, the network entities in an LTE network communicate across the interfaces between them by means of packet flows, referred to as bearers, which are set up by specific protocols. The UE and eNB communicate over the air interface using both data radio bearers and signaling radio bearers. The eNB communicates with core network components by means of S1 bearers. The LTE air interface, also referred to as the radio interface or radio access network (RAN), has a layered protocol architecture where peer layers of the UE and eNB pass protocol data units (PDUs) between each other that are encapsulated service data units (SDUs) of the next higher layer. The topmost layer in the user plane is the packet data compression protocol (PDCP) layer which transmits and receives IP (internet protocol) packets. The topmost layer of the control plane in the access stratum between the UE and eNB is the radio resource control (RRC) layer. The PDCP layer communicates with the radio link control (RLC) layer via radio bearers to which IP packets are mapped. At the medium access control (MAC) layer, the connection to the RLC layer above is through logical channels, and the connection to the physical layer below is through transport channels. Among other things, the MAC layer provides functionality for performing the random access procedure as described below.

Figure 2:
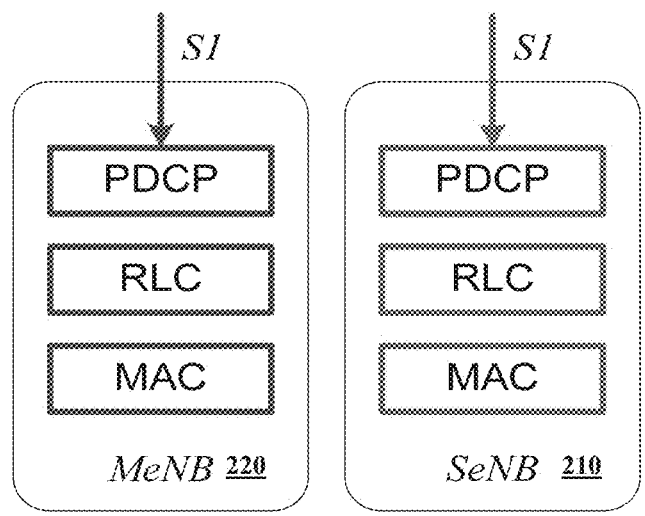
FIG. 2 illustrates an example architecture for routing S1 bearers by an SeNB (secondary eNB) and an MeNB (master eNB) in accordance with some embodiments.
Figure 3:
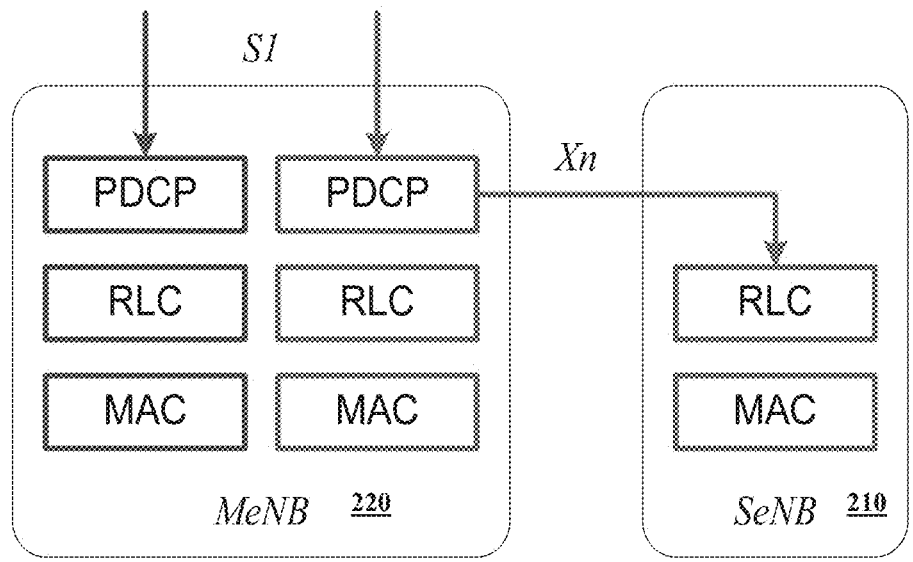
FIG. 3 illustrates an example architecture for routing S1 bearers by an SeNB and an MeNB in accordance with some embodiments.

FIGS. 2 and 3 illustrate different example architectures for providing dual connectivity to a UE by MeNB 220 and SeNB 210 and the routing S1 bearers taking the downlink direction as an example. In FIG. 2, S1 bearers terminate in both the SeNB and the MeNB, and there are independent PDCP entities in each. In FIG. 3, S1 bearers terminate in the MeNB only. A bearer may be split in the PDCP layer of the MeNB with independent RLC entities in the MeNB and SeNB for such split bearers.

The physical layer of LTE is based upon orthogonal frequency division multiplexing (OFDM) for the downlink and a related technique, single carrier frequency division multiplexing (SC-FDM), for the uplink. The downlink and uplink transmissions are organized into radio frames each having a duration of 10 ms, and each radio frame consists of 10 subframes of 1 ms each. Individual symbols are transmitted by means of time-frequency resources that correspond to a particular subcarrier of a particular OFDM symbol. When a UE is in a connected state, all uplink and downlink resources are allocated by the eNB. At the physical level, those resources are segregated into separate physical channels. The UE is allocated resources in the physical uplink control channel (PUCCH) for requesting resources for transmitting data to the eNB over the physical uplink shared channel (PUSCH). If the UE has not been allocated resources on the PUCCH for transmitting such a scheduling request, the UE may use a random access procedure for the scheduling request.

The eNB grants uplink and downlink resources using the physical downlink control channel (PDCCH), where an individual control message is referred to as downlink control information (DCI). A CRC (cyclic redundancy check) is attached to each DCI message payload. The identity of the terminal (or terminals) for which the DCI is intended is specified by a radio network temporary identifier (RNTI) that is included in the CRC calculation and not explicitly transmitted. Depending on the purpose of the DCI different RNTIs used, such as the terminal-specific C-RNTI (cell RNTI) for normal unicast data transmission. A terminal searches the received PDCCH for DCIs addressed to it by checking the CRCs using its set of assigned RNTIs. The terminal blindly decodes the PDCCH by searching elements of the PDCCH in a search space that includes a common search space (CSS) that all terminals search and may also include a terminal specific search space.

In an LTE system, specific time-frequency resources are reserved for use by UEs in performing a random access procedure, referred to as the physical random access channel (PRACH). The location of the PRACH in the time-frequency grid is broadcast to UEs in a system information block (SIB). Random access may be used by a UE for several purposes including: for initial access to establish a connection with an eNB, for transitioning from an idle state to a connected state, for establishing or re-establishing synchronization with the eNB including receiving a timing advance parameter to compensate for the time it takes for uplink transmissions to reach the eNB, and during a handover process to a new cell.

The random access procedure begins when the mobile transmits a random access preamble on the physical random access channel (PRACH). This initiates an exchange of messages between the mobile and the base station that may be either non-contention-based or contention-based. In a conventional single connectivity scenario, the UE first transmits a random-access preamble using the PRACH to the eNB, referred to as Msg1. The eNB responds with a random access response (RAR) over the PDCCH using a random access-RNTI (RA-RNTI) to address the UE. The RA-RNTI is derived from the specific time-frequency resources that the UE selects for transmitting Msg1. The UE then transmits an identification message referred to as Msg3 to the eNB using a PUSCH resource assigned to the UE by Msg2 that may also include a scheduling request. The eNB then transmits a grant message referred to as Msg 4 to the UE which resolves any contention due to multiple UEs performing a random access procedure using the same preamble and receiving the same random access response from the eNB. If the random access procedure is successful, the UE is granted uplink resources. A non-contention-based random access procedure is similar but uses a dedicated preamble allocated to the UE by the eNB.

Figure 4:
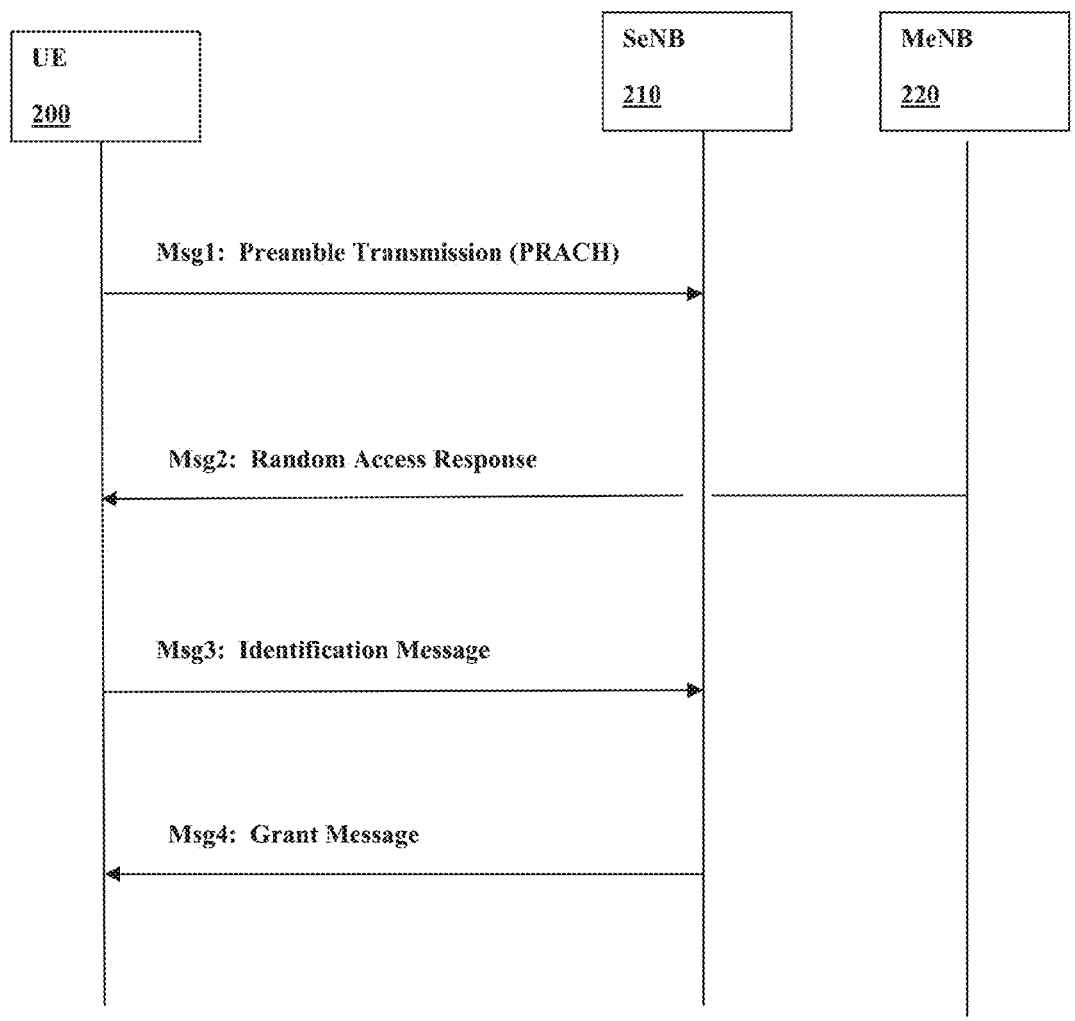
FIG. 4 illustrates a random access procedure in a dual-connectivity context in accordance with some embodiments.

FIG. 4 illustrates the steps involved in performing a contention-based RA procedure in a dual connectivity context according to one embodiment, where the UE 200 is connected to MeNB 220 and attempts to acquire access to SeNB 210. For Msg1, the UE transmits the random-access preamble using the PRACH to the SeNB 210. The preamble transmission indicates to the SeNB the presence of a UE performing a random access procedure and also allows the SeNB to estimate the transmission delay between the UE and SeNB for adjusting the uplink timing. This information is transmitted over a backhaul connection (e.g., $X_2$ or $X_n$ interface to the MeNB 220). For Msg2, the MeNB 220 transmits the random access response which includes a timing advance command to the UE 200 to allow it to adjust the timing of its uplink transmissions to SeNB 210 based on the timing estimate obtained from Msg1 and also assigns uplink resources to the terminal to be used in the next message. For Msg3, the UE 200 transmits its identification message to the SeNB 210 using a PUSCH resource assigned to the UE by Msg2. For Msg4, the SeNB 210 transmits the grant message to the UE 200.

The dual-connectivity random access procedure described above with reference FIG. 4 may include several modifications as compared with a conventional single-connectivity random access procedure. For example, the random access response (Msg2) is transmitted over the PDCCH using an RA-RNTI derived from the time-frequency resources used by the UE to transmit the random access preamble. In a dual-connectivity context, the same RA-RNTI as used for a single-connectivity random access procedure may be used by the MeNB to transmit Msg2. Alternatively, a separately derived RNTI, which may be referred to as RA-RNTI2, could be used to distinguish a Msg2 in response to a random access preamble transmitted to the SeNB from a Msg2 in response to a random access preamble transmitted to the MeNB. Such a feature would be useful in the situation where the UE performs random access procedures to access both the SeNB and the MeNB in parallel. Also, according to the LTE specifications for a single-connectivity random access procedure, the UE monitors for PDCCH for Msg2 in an RAR window that starts 3 ms (i.e., 3 subframes) after the end of the random access preamble transmission. The number of blind decoding attempts that UE is to perform is specified by a configurable ra-ResponseWindowSize parameter that specifies how many subframes after the start of the RAR window the UE is supposed search for the random access response. The value of ra-ResponseWindowSize may be from 2 up to 10 subframes with a value taken from the set {2, 3, 4, 5, 6, 7, 8, 10}. To compensate for the latency of a non-ideal backhaul connection between the SeNB and the MeNB in a dual-connectivity context, the RAR window start timing may be changed from 3 ms (or 3 subframes) to larger value (e.g., 70, 80, 90, 100 ms, or more) with the UE performing the same blind decoding attempts after the start of the RAR window.

EXAMPLE EMBODIMENTS

In Example 1, a method for operating a user equipment (UE) device, comprises: receiving communications from a master evolved Node B (MeNB) and a secondary evolved Node B (SeNB) over MeNB and SeNB cells, respectively; initiating a random access procedure for the SeNB by transmitting a random access preamble over an SeNB cell; and, receiving a random access response (RAR) over an MeNB cell.

In Example 2, the subject matter of Example 1 may optionally include transmitting an identification message in response to the RAR over the SeNB cell.

In Example 3, the subject matter of Example 1 or Example 2 may optionally include receiving a grant message in response to the identification message over the SeNB cell.

In Example 4, the subject matter of Example 1 may optionally include, in order to receive the RAR, attempting to decode a physical downlink control channel (PDCCH) in the MeNB cell.

In Example 5, the subject matter of Example 1 may optionally include, in order to receive the RAR, attempting to decode the PDCCH using a random access radio network temporary identifier (RA-RNTI2) derived from the particular time-frequency resources used to transmit the random access preamble.

In Example 6, the subject matter of Example 4 may optionally include, in order to receive the RAR, deriving the RA-RNTI2 differently from how a random access radio network temporary identifier (RA-RNTI) used in a random access procedure for the MeNB is derived.

In Example 7, the subject matter of Examples 4 through 6 may optionally include, in order to receive the RAR, attempting to decode the PDCCH in an RAR window of specified duration starting a specified number of subframes after the end of the random access preamble transmission.

In Example 8, the subject matter of Example 7 may optionally include wherein the specified number of subframes after the end of the random access preamble transmission is three.

In Example 9, the subject matter of Example 7 may optionally include wherein the specified number of subframes after the end of the random access preamble transmission is greater than three.

In Example 10, the subject matter of Example 7 may optionally include wherein the specified number of subframes after the end of the random access preamble transmission is a number equal to or greater than a number selected from the set {70, 80, 90, 100}.

In Example 11, a user equipment (UE) device, comprises: a radio transceiver to provide air interfaces to a master evolved Node B (MeNB) and a secondary evolved Node B (SeNB) that provide MeNB and SeNB cells, respectively; and processing circuitry connected to the radio transceiver to perform any of the methods recited in Examples 1 through 10.

In Example 12, a computer-readable medium containing instructions for performing any of the methods recited in Examples 1 through 10.

In Example 13, a user equipment (UE) comprises means for performing any of the methods recited in Examples 1 through 10.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. For more information with respect to UTRAN LTE standards, see the 3rd Generation Partnership Project (3GPP) standards for UTRAN-LTE, release 12, including variations and evolutions thereof. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user equipment (UE) device, comprising:
   a radio transceiver to provide air interfaces to a master evolved Node B (MeNB) and a secondary evolved Node B (SeNB) that provide MeNB and SeNB cells, respectively; and
   processing circuitry connected to the radio transceiver to:
   initiate a random access procedure by transmitting a random access preamble to the SeNB and the MeNB;
   receive a random access response (RAR) over the MeNB cell,
   distinguish between an RAR received in response to the random access preamble transmitted to the SeNB and an RAR received in response to the random access preamble transmitted to the MeNB by using separately derived random access radio network temporary network identifiers (RA-RNTIs).

2. The UE of claim 1 wherein the processing circuitry is to transmit an identification message in response to the RAR over the SeNB cell.

3. The UE of claim 2 wherein the processing circuitry is to receive a grant message in response to the identification message over the SeNB cell.

4. The UE of claim 1 wherein the processing circuitry is to, in order to receive the RAR, attempt to decode a physical downlink control channel (PDCCH) in the MeNB cell.

5. The UE of claim 1 wherein the processing circuitry is to, in order to receive the RAR, attempt to decode the PDCCH using a random access radio network temporary identifier (RA-RNTI2) derived from the particular time-frequency resources used to transmit the random access preamble.

6. The UE of claim 4 wherein the processing circuitry is to, in order to receive the RAR, derive the RA-RNTI2 differently from how a random access radio network temporary identifier (RA-RNTI) used in a random access procedure for the MeNB is derived.

7. The UE of claim 4 wherein the processing circuitry is to, in order to receive the RAR, attempt to decode the PDCCH in an RAR window of specified duration starting a specified number of subframes after the end of the random access preamble transmission.

8. The UE of claim 7 wherein the specified number of subframes after the end of the random access preamble transmission is three.

9. The UE of claim 7 wherein the specified number of subframes after the end of the random access preamble transmission is greater than three.

10. The UE of claim 7 wherein the specified number of subframes after the end of the random access preamble transmission is a number equal to or greater than a number selected from the set {70, 80, 90, 100}.

11. A method for operating a user equipment (UE) device, comprising:
    receiving communications from a master evolved Node B (MeNB) and a secondary evolved Node B (SeNB) over MeNB and SeNB cells, respectively;
    initiating a random access procedure by transmitting a random access preamble to the SeNB and the MeNB;
    receiving a random access response (RAR) over the MeNB cell; and,
    distinguishing between an RAR received in response to the random access preamble transmitted to the SeNB and an RAR received in response to the random access preamble transmitted to the MeNB by using separately derived random access radio network temporary network identifiers (RA-RNTIs).

12. The method of claim 11 further comprising transmitting an identification message in response to the RAR over the SeNB cell.

13. The method of claim 12 further comprising receiving a grant message in response to the identification message over the SeNB cell.

14. The method of claim 11 further comprising, in order to receive the RAR, attempting to decode a physical downlink control channel (PDCCH) in the MeNB cell.

15. The method of claim 11 further comprising, in order to receive the RAR, attempting to decode the PDCCH using a random access radio network temporary identifier (RA-RNTI2) derived from the particular time-frequency resources used to transmit the random access preamble.

16. The method of claim 14 further comprising, in order to receive the RAR, deriving the RA-RNTI2 differently from how a random access radio network temporary identifier (RA-RNTI) used in a random access procedure for the MeNB is derived.

17. The method of claim 14 further comprising, in order to receive the RAR, attempting to decode the PDCCH in an RAR window of specified duration starting a specified number of subframes after the end of the random access preamble transmission.

18. The method of claim 17 wherein the specified number of subframes after the end of the random access preamble transmission is three.

19. The method of claim 17 wherein the specified number of subframes after the end of the random access preamble transmission is greater than three.

20. The method of claim 17 wherein the specified number of subframes after the end of the random access preamble transmission is a number equal to or greater than a number selected from the set {70, 80, 90, 100}.

21. A non-transitory computer-readable storage medium that stores instructions for execution by one or more processors of a user equipment (UE) to perform operations to configure the UE to:
    receive communications from a master evolved Node B (MeNB) and a secondary evolved Node B (SeNB) over MeNB and SeNB cells, respectively;
    initiate a random access procedure by transmitting a random access preamble to the SeNB and the MeNB;
    receive a random access response (RAR) over the MeNB cell; and;
    distinguish between an RAR received in response to the random access preamble transmitted to the SeNB and an RAR received in response to the random access preamble transmitted to the MeNB by using separately derived random access radio network temporary network identifiers (RA-RNTIs).

22. The computer-readable storage medium of claim 21 that further stores instructions or execution by one or more processors of a user equipment to perform operations to configure the UE to, in order to receive the RAR, attempt to decode a physical downlink control channel (PDCCH) in the MeNB cell in an RAR window of specified duration starting a specified number of subframes after the end of the random access preamble transmission.

23. The computer-readable storage medium of claim 22 wherein the specified number of subframes after the end of the random access preamble transmission is greater than three.

24. The computer-readable storage medium of claim 22 wherein the specified number of subframes after the end of the random access preamble transmission is a number equal to or greater than a number selected from the set {70, 80, 90, 100}.

* * * * *